United States Patent [19]

Herb

[11] 3,985,068

[45] Oct. 12, 1976

[54] MOUNTING ASSEMBLY FOR AIR CONDITIONING TERMINALS

[75] Inventor: Carl C. Herb, Camillus, N.Y.

[73] Assignee: Carrier Corporation, Syracuse, N.Y.

[22] Filed: June 10, 1975

[21] Appl. No.: 585,559

[52] U.S. Cl. ................................ 98/40 D; 98/103; 236/49; 52/758 C
[51] Int. Cl.² .................................................. F24F 7/00
[58] Field of Search ............... 98/40 C, 40 D, 40 R, 98/103; 236/49; 29/526; 52/758 F, 758 C; 403/388

[56] References Cited
UNITED STATES PATENTS

| | | | |
|---|---|---|---|
| 2,632,942 | 3/1953 | Berg et al. ............................ | 29/256 |
| 2,729,064 | 1/1956 | Kennedy et al. ................... | 52/728 C |
| 2,926,350 | 2/1960 | Saul, Sr. .............................. | 403/388 |
| 3,591,076 | 7/1971 | Bryans ................................ | 98/40 D |

Primary Examiner—William E. Wayner
Assistant Examiner—Henry C. Yuen
Attorney, Agent, or Firm—J. Raymond Curtin; Barry E. Deutsch

[57] ABSTRACT

An assembly for releasably connecting a diffuser section of an air conditioning terminal to a pair of opposed spaced walls includes first and second mounting brackets respectively permanently affixed to each of said spaced end walls. Each bracket includes a retainer permanently affixed thereto. Third and fourth mounting brackets are permanently affixed substantially adjacent each end of the diffuser section. Each bracket includes a removable securing member alignable with the retainer to connect the diffuser section to the end walls of the terminal.

3 Claims, 4 Drawing Figures

MOUNTING ASSEMBLY FOR AIR CONDITIONING TERMINALS

BACKGROUND OF THE INVENTION

This invention relates to a mounting assembly for an air conditioning terminal, and in particular, to an assembly for releasably connecting a diffuser section in an opening provided between a pair of opposed spaced end walls of the terminal.

In recent times, the utilization of air conditioning terminals mounted in the ceiling of a space to be conditioned has become increasingly prevalent. In particular, in commercial installations such as office buildings, the use of such air conditioning terminals permits the owner of the building to provide conditioned air without diminishing the rentable floor area, as for example occurs when the air conditioning terminals are mounted on the floor of the space being conditioned.

In U.S. Pat. No. 3,591,076, there is disclosed a ceiling terminal that has enjoyed substantial commercial success. The terminal therein disclosed includes a removable diffuser section having a control section in which there is mounted filters, thermostats and volume regulators for controlling the operation of the terminal. The diffuser section further includes an inflatable damper for regulating the quantity of air discharged from the unit. The removability feature of the diffuser section permits the filter to be easily cleaned or replaced and further permits maintenance to be performed as required on the terminal controls. However, if maintenance personnel are not careful in removing the diffuser section, damage might occur to the inflatable damper.

Terminals of the type described are very often mounted in "false" ceiling installations, that is to say, installations wherein acoustical and aesthetically pleasing tiles are suspended beneath the actual ceiling of the space. These tiles are generally removable. Accordingly, some personnel have found it more convenient to push aside some tiles to perform any required maintenance on the controls while the diffuser section is in its normal position in the ceiling installation, rather than to disconnect the diffuser section from the remainder of the air conditioning terminal. The foregoing eliminated any potential damage to the inflatable damper due to the removal of the diffuser section.

In order to minimize manufacturing costs, the elements providing the removability feature of the diffuser section were eliminated, in view of such feature's limited use. In addition, to further decrease manufacturing costs, the diffuser section was separated from the portion of the terminal mounting the inflatable dampers in the manner shown in co-pending application, Ser. No. 447,603, filed Mar. 4, 1974 and assigned to the same assignee as the assignee hereof.

However, it has now been determined, some of the newer installations involve the mounting of such terminals in ceilings made from materials such as cement, stucco, or the like, wherein there is no possibility of gaining access to the control section of the diffuser once the terminal has been fixed in place in the ceiling. Such ceiling installations shall be hereinafter referred to as "permanent" installations. Accordingly, it is again necessary to include elements providing a removability feature for the diffuser section. However, the means of obtaining such feature as disclosed in the aforecited patent is not suitable for use with terminals of the type described in the co-pending application.

SUMMARY OF THE INVENTION

Accordingly, it is an object of this invention to permit the removal of a diffuser section of an air conditioning terminal mounted in a cement ceiling installation.

It is a further object of this invention to releasably connect a diffuser section mounting air conditioning terminal controls in an opening provided between a pair of opposed spaced end walls of the terminal.

It is yet another object of this invention to readily permit the removal of a diffuser section of an air conditioning terminal mounted within a permanent ceiling installation without materially increasing the cost of manufacturing such terminals.

These and other objects of the present invention are obtained by providing an assembly for releasably connecting a diffuser section of an air conditioning terminal to a pair of opposed spaced end walls. First and second mounting brackets are respectively permanently affixed to one of the spaced end walls. Each bracket includes retaining means permanently affixed thereto. Third and fourth mounting brackets are respectively permanently affixed substantially adjacent each end of the diffuser section. Each bracket includes removable securing means alignable with the retaining means to connect the diffuser section to the end walls of the terminal.

DESCRIPTION OF THE PREFERRED EMBODIMENT

Referring now to the various figures of the drawings, there is disclosed a preferred embodiment of the instant invention. In referring to the various figures, like numerals shall refer to like parts.

Figure 1:
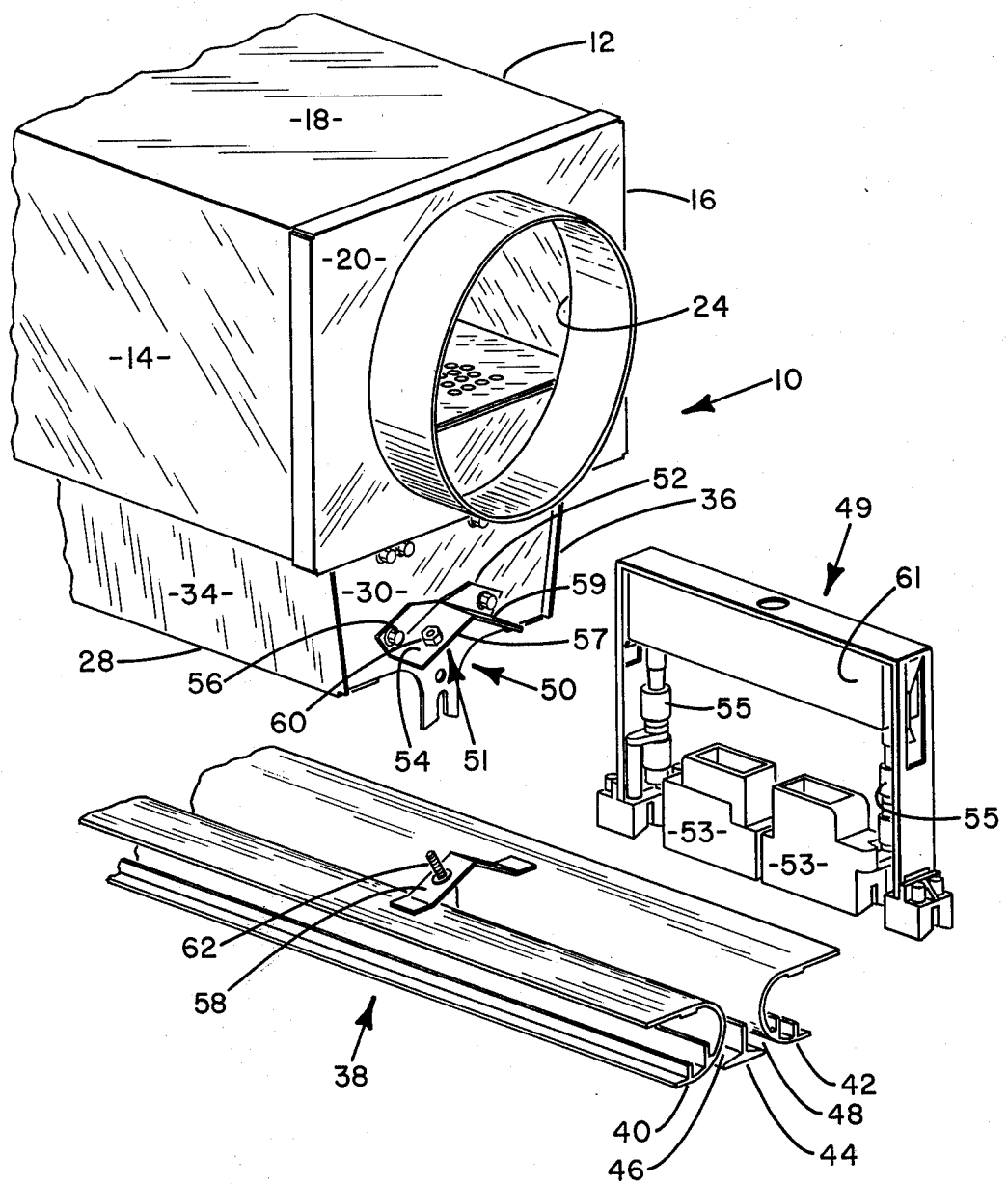
FIG. 1 is an exploded, perspective, fragmentary view of an air conditioning terminal including the present invention.
Figure 2:
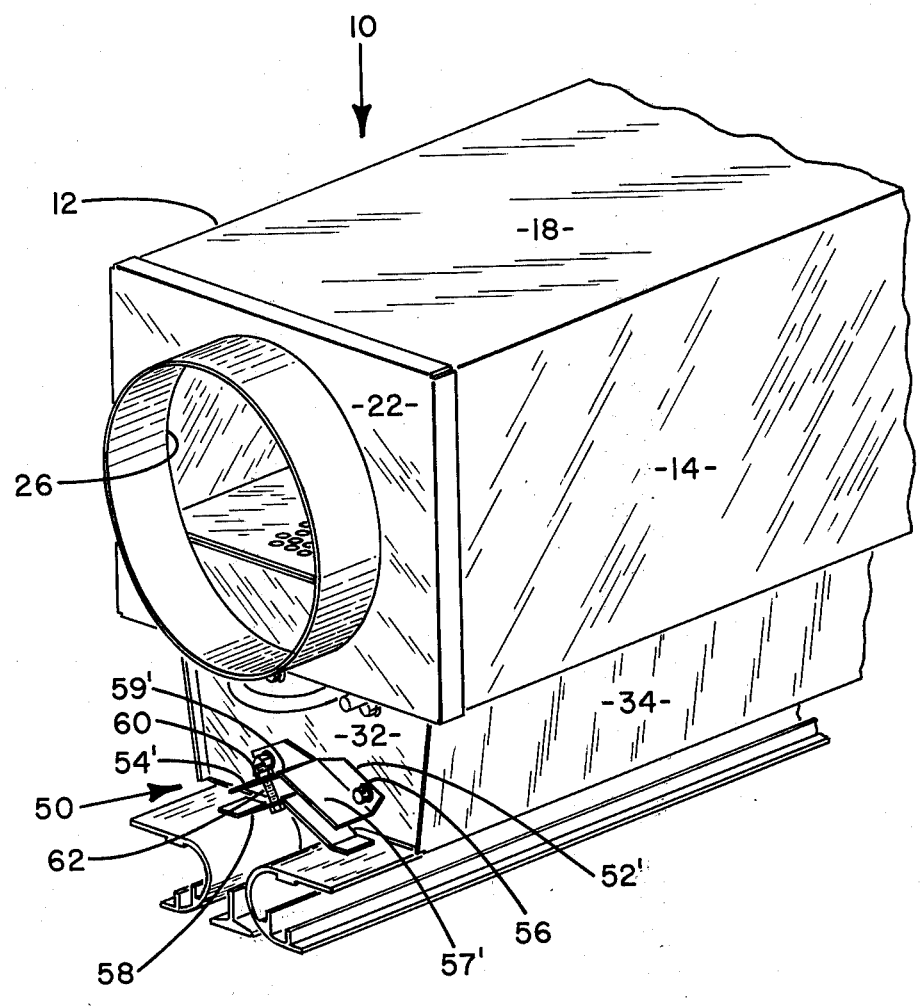
FIG. 2 is a perspective view showing the end of the terminal not illustrated in FIG. 1.
Figure 3:
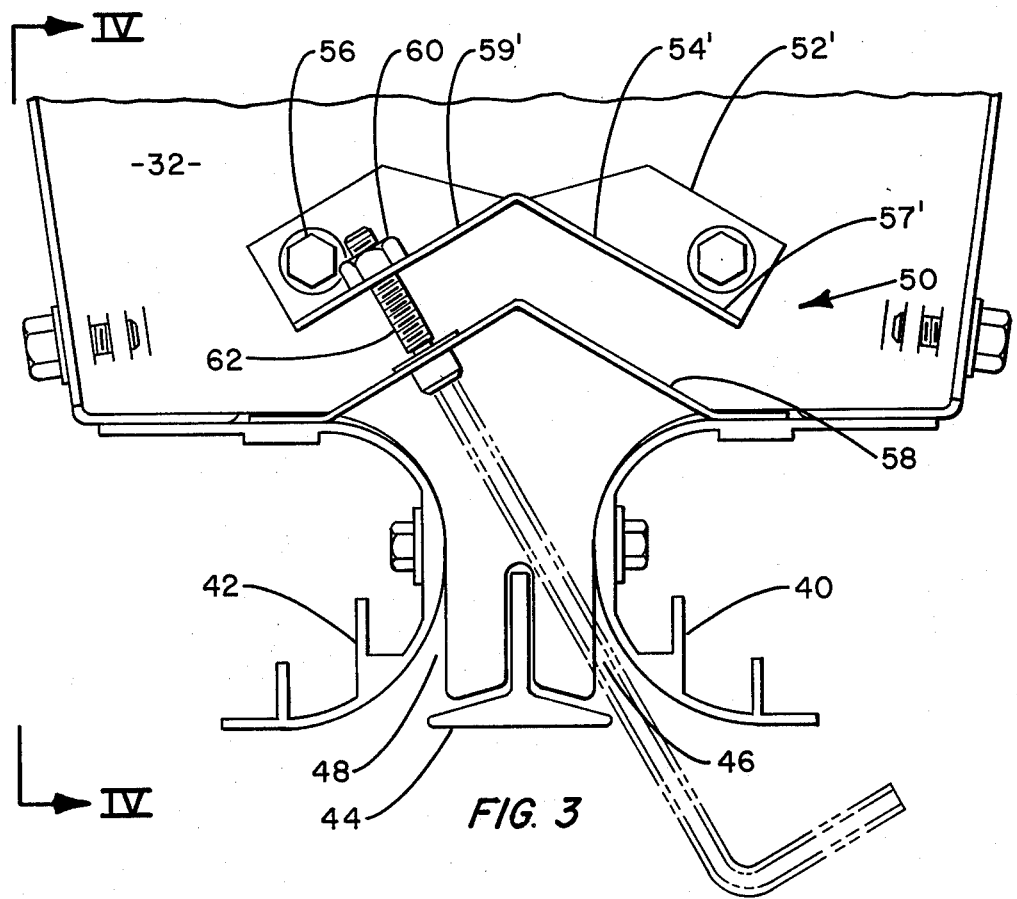
FIG. 3 is a fragmentary plan view of the terminal illustrated in FIG. 1 further showing details of the instant invention.
Figure 4:
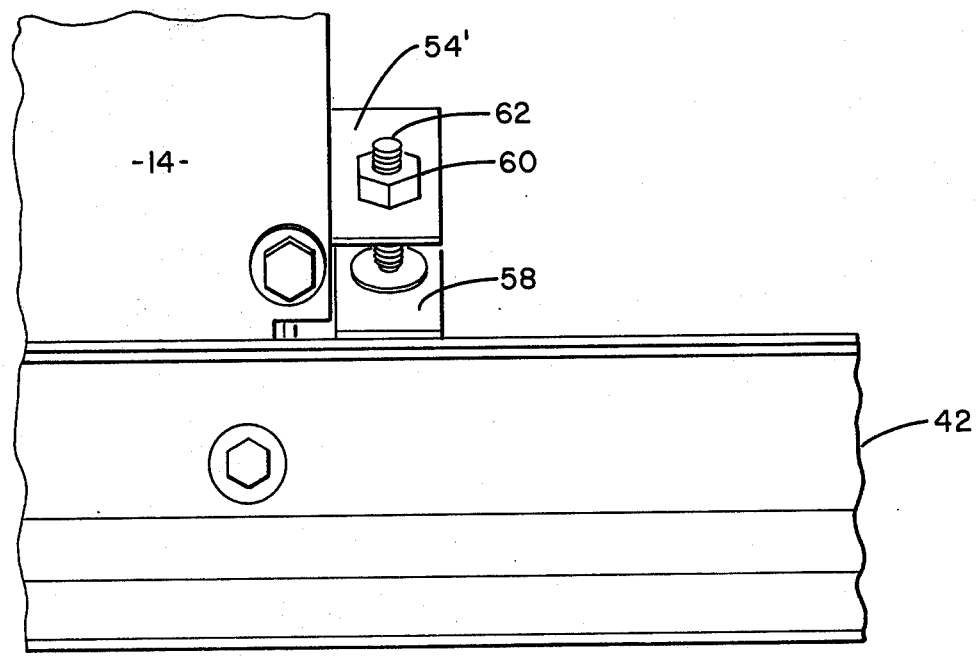
FIG. 4 is a sectional view taken along the line IV—IV of FIG. 3.

In FIGS. 1 and 2, there are disclosed perspective views of an air conditioning terminal of the type in which the instant invention is employed. Terminal 10 is of the type adapted for use in ceiling installations wherein conditioned air is delivered from the terminal to condition a space or room. Terminal 10 is provided as a part of an air conditioning system generally including central air conditioning apparatus which may comprise a filter, pre-cooling coil, spray means, a cooling coil, a heating coil, and a fan for heating, cooling, dehumidifying, humidifying and filtering the air as desired. The fan is provided to distribute the conditioned air through supply ducts which are provided to supply the conditioned air to air conditioning terminals located throughout a building.

Terminal 10 includes a plenum section 12 defined by opposed sidewalls 14 and 16, top wall 18, and opposed end walls 20 and 22. End walls 20 and 22 are preferably provided with openings 24 and 26 so the terminals may be connected end to end to form a total air conditioning system. The terminal further includes a lower section 28 having opposed spaced end walls 30 and 32. Side walls 34 and 36 in combination with the end walls define therebetween an air passage. Inflatable dampers (not shown) are partially disposed in the air passage and partially disposed in the plenum section. The inflatable damper is employed to regulate the quantity of air discharged from the terminal.

The terminal further includes a diffuser section 38 preferably comprising side diffuser members 40 and 42 and a center diffuser member 44. The three diffuser members define therebetween discharge air passages 46 and 48. The three diffuser members are connected together to form a subassembly.

As shown in FIG. 1, the diffuser section includes a control section 49 in which the control elements regulating the operation of the air conditioning terminal are disposed. Such control elements may comprise a filter 61, thermostats 53 and volume control devices 55.

As noted hereinbefore, terminals of the type disclosed may be installed in either false ceiling installations or in permanent ceiling installations. When installed in a permanent ceiling installation, it is essential that the diffuser section be readily detachable from the remainder of the air conditioning terminal so the control elements may be accessible for maintenance and/or repair. To obtain the foregoing objective, a novel mounting assembly 50 is employed. The mounting assembly includes a first bracket member 51 preferably having a vertical section or leg 52 and a horizontally extending portion or leg 54. Leg 54 preferably extends outwardly from the lower edge of leg 52, and is shaped in a generally inverted V-configuration. The angle between arms 57 and 59 of portion 54 is generally 120°.

As illustrated in FIG. 1, leg 52 is permanently secured to the outer surface of one end wall 30. As shown in FIG. 2, an identical mounting bracket including legs 52' and 54' is provided adjacent the other end of the terminal. Leg 54' includes arms 57' and 59'. Leg 52' is secured to the outer surface of the other end wall 32. Suitable means such as screws 56 are employed to join the vertical legs to the end walls. Retainer means such as nuts 60 are permanently affixed to the top surface of horizontal legs 54 and 54' for a reason to be more fully explained hereinafter. Retainer means 60 is affixed at the mid-point of arms 57 and 59'.

The mounting assembly further includes second brackets 58 permanently affixed substantially to each of the ends of the diffuser section. Brackets 58 are of the same generally inverted V-shaped configuration as legs 54 and 54'. Each bracket includes removable securing means, for example screw 62. The screw is alignable with retaining means 60 affixed to arms 57 and 59' of the first mounting bracket. Utilization of a mounting assembly at either end of the diffuser section permits the diffuser section to be releasably connected to the remaining portion of the air conditioning terminal.

When it is desired to disconnect the diffuser section from the upper portion of the air conditioning terminal, suitable means, for example an elongated Allen-type wrench, is employed to disconnect the securing means from the retaining means. Since the arms of brackets 54 and 58 are at 120° angles to each other, screw 62 is accessible in the manner illustrated. Essentially, the angled relationship of the arms permits the removal tool to be inserted in the discharge slot defined between diffuser sections 40 and 44. This permits the diffuser section to be readily detached from the remaining portion of the air conditioning terminal. The mounting assembly disclosed herein permits the diffuser section having the control components to be readily removed. By maintaining retainer means 60 in a permanent position on horizontal legs 54 and 54'; the reinstallation of the diffuser section may be readily reaccomplished merely by properly aligning the first and second brackets via securing means 62. Thus, the mounting assembly further permits the diffuser section to be reattached in an expeditious manner.

While a preferred embodiment of the instant invention has been described and illustrated, the invention should not be limited thereto, but may be otherwise embodied within the scope of the following claims.

I claim:

1. An assembly for releasably connecting a diffuser section of an air conditioning terminal having a pair of opposed spaced end walls comprising:
   first and second mounting brackets respectively permanently affixed to one of said spaced end walls, each bracket including generally inverted V-shaped arm portions, with one of said arm portions having retaining means permanently affixed thereto; and
   third and fourth mounting brackets respectively permanently affixed substantially adjacent each end of said diffuser section, with each bracket including generally V-shaped arm portions, with the angle between the arm portions of said third and fourth brackets being substantially equal to the angle between the arm portions of said first and second brackets, each of said third and fourth brackets further including removable securing means alignable with said retaining means to connect said diffuser section to said end walls of said terminal.

2. An assembly in accordance with claim 1, wherein the arm portions of said first and second brackets are disposed substantially at an angle of 126° with respect to each other.

3. An assembly in accordance with claim 2 wherein said diffuser section includes first and second spaced apart members with said third and fourth brackets being permanently affixed thereto.

* * * * *